United States Patent
Gadhe et al.

(10) Patent No.: US 11,425,170 B2
(45) Date of Patent: Aug. 23, 2022

(54) SYSTEM AND METHOD FOR DEPLOYING AND CONFIGURING CYBER-SECURITY PROTECTION SOLUTION USING PORTABLE STORAGE DEVICE

(71) Applicant: Honeywell International Inc., Morris Plains, NJ (US)

(72) Inventors: Ganesh Patilba Gadhe, Phoenix, AZ (US); Kevin McMurdie, Surprise, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 386 days.

(21) Appl. No.: 16/574,466

(22) Filed: Sep. 18, 2019

(65) Prior Publication Data

US 2020/0120136 A1    Apr. 16, 2020

Related U.S. Application Data

(60) Provisional application No. 62/744,191, filed on Oct. 11, 2018.

(51) Int. Cl.
*G06F 21/00* (2013.01)
*H04L 9/40* (2022.01)
*G06F 21/57* (2013.01)

(52) U.S. Cl.
CPC ............ *H04L 63/20* (2013.01); *G06F 21/575* (2013.01); *H04L 63/145* (2013.01); *G06F 2221/034* (2013.01)

(58) Field of Classification Search
None
See application file for complete search history.

(56) References Cited

U.S. PATENT DOCUMENTS 6,052,514 A   4/2000   Gill et al.
6,640,302 B1  10/2003  Subramaniam et al.
(Continued)

FOREIGN PATENT DOCUMENTS

EP    2672414 A1    12/2013
JP    2009020822 A  1/2009
(Continued)

OTHER PUBLICATIONS

Arseni, Stefan-Ciprian et al. Pass-IoT: A platform for studying security, privacy and trust in IoT. 2016 International Conference on Communications. https://ieeexplore.ieee.org/stamp/stamp.jsp?tp=&arnumber=7528258 (Year: 2016).*

(Continued)

*Primary Examiner* — Jeremiah L Avery
(74) *Attorney, Agent, or Firm* — Seager, Tufte & Wickhem, LLP (57) ABSTRACT

This disclosure provides a system and method for deploying and configuring a cyber-security protection solution using a portable storage device. The portable storage device may include a memory storing instructions to be executed by a computing device. When executed, the instructions may cause the computing device to implement a cyber-security protection solution that is configured to scan a second storage device and determine whether the second storage device is usable in a protected environment.

16 Claims, 4 Drawing Sheets

(56) References Cited

U.S. PATENT DOCUMENTS

| | | |
|---|---|---|
| 7,010,647 B1 | 3/2006 | Karamchetty et al. |
| 7,464,219 B2 | 12/2008 | Hinrichs et al. |
| 7,640,589 B1 | 12/2009 | Mashevsky et al. |
| 7,697,942 B2 | 4/2010 | Stevens |
| 7,849,502 B1 | 12/2010 | Bloch et al. |
| 7,860,798 B2 | 12/2010 | Rubinstein |
| 7,865,947 B2 | 1/2011 | Fanton et al. |
| 7,890,612 B2 | 2/2011 | Todd et al. |
| 8,271,790 B2 | 9/2012 | Rosenan et al. |
| 8,474,032 B2 | 6/2013 | Fetik |
| 8,832,691 B2 | 9/2014 | Fitzgerald et al. |
| 8,869,307 B2 | 10/2014 | Broch et al. |
| 8,925,101 B2 | 12/2014 | Bhargava et al. |
| 9,059,978 B2 | 6/2015 | Kotani et al. |
| 9,129,138 B1 | 9/2015 | Hesselink et al. |
| 9,170,833 B2 | 10/2015 | Fitzgerald et al. |
| 9,307,317 B2 | 4/2016 | Chang et al. |
| 9,336,375 B1 | 5/2016 | Sharma et al. |
| 9,455,955 B2 | 9/2016 | Fetik |
| 9,589,130 B2 | 3/2017 | Shanklin et al. |
| 9,654,481 B1 | 5/2017 | Ho |
| 9,672,374 B2 | 6/2017 | Kabra et al. |
| 9,781,148 B2 | 10/2017 | Mahaffey et al. |
| 9,967,267 B2 | 5/2018 | Ladnai et al. |
| 9,984,234 B2 | 5/2018 | Jaman |
| 10,044,719 B2 | 8/2018 | Desai et al. |
| 2001/0054042 A1 | 12/2001 | Watkins et al. |
| 2002/0038430 A1 | 3/2002 | Edwards et al. |
| 2002/0196744 A1 | 12/2002 | O'Connor |
| 2003/0126118 A1 | 7/2003 | Burton et al. |
| 2004/0015441 A1 | 1/2004 | Ebihara et al. |
| 2004/0123127 A1 | 6/2004 | Teicher et al. |
| 2004/0221172 A1 | 11/2004 | Stamos et al. |
| 2005/0144141 A1 | 6/2005 | Nagao |
| 2005/0154908 A1 | 7/2005 | Okamoto |
| 2005/0187989 A1 | 8/2005 | Kaneko |
| 2005/0188369 A1 | 8/2005 | Evers |
| 2005/0206353 A1 | 9/2005 | Sengoku |
| 2005/0210249 A1 | 9/2005 | Lee et al. |
| 2005/0216739 A1 | 9/2005 | Lee et al. |
| 2005/0267845 A1 | 12/2005 | Oh et al. |
| 2006/0004974 A1 | 1/2006 | Lin et al. |
| 2006/0200664 A1 | 9/2006 | Whitehead et al. |
| 2006/0230203 A1 | 10/2006 | Cheng et al. |
| 2006/0253894 A1* | 11/2006 | Bookman ............... H04L 63/08 455/414.2 |
| 2007/0028110 A1 | 2/2007 | Brennan |
| 2007/0028291 A1 | 2/2007 | Brennan et al. |
| 2007/0118735 A1 | 5/2007 | Cherrington et al. |
| 2007/0118757 A1 | 5/2007 | Skinner et al. |
| 2007/0150956 A1 | 6/2007 | Sharma et al. |
| 2007/0180509 A1 | 8/2007 | Swartz et al. |
| 2007/0199060 A1* | 8/2007 | Touboul ............... H04W 12/12 726/11 |
| 2007/0245108 A1 | 10/2007 | Yasaki et al. |
| 2007/0261112 A1 | 11/2007 | Todd et al. |
| 2008/0022360 A1 | 1/2008 | Bacastow |
| 2008/0083037 A1 | 4/2008 | Kruse et al. |
| 2008/0235803 A1 | 9/2008 | Harada |
| 2008/0256076 A1 | 10/2008 | Claus et al. |
| 2008/0282350 A1 | 11/2008 | Khilnani et al. |
| 2008/0320317 A1 | 12/2008 | Funahashi et al. |
| 2009/0319782 A1 | 12/2009 | Lee |
| 2010/0114825 A1 | 5/2010 | Siddegowda |
| 2010/0211792 A1 | 8/2010 | Ureche et al. |
| 2010/0217837 A1* | 8/2010 | Ansari ............... H04L 12/2818 709/224 |
| 2010/0287620 A1 | 11/2010 | Fanton et al. |
| 2010/0293374 A1 | 11/2010 | Bushby |
| 2010/0323714 A1 | 12/2010 | Schmidt et al. |
| 2011/0016298 A1 | 1/2011 | McCollom |
| 2011/0030030 A1 | 2/2011 | Terpening et al. |
| 2011/0087899 A1 | 4/2011 | Fetik |
| 2011/0113235 A1* | 5/2011 | Erickson ............... G06F 21/34 713/192 |
| 2011/0167050 A1 | 7/2011 | Fanton et al. |
| 2011/0173443 A1 | 7/2011 | Osterwalder et al. |
| 2011/0237234 A1 | 9/2011 | Kotani et al. |
| 2011/0239210 A1 | 9/2011 | Kotani et al. |
| 2012/0030731 A1 | 2/2012 | Bhargava et al. |
| 2012/0054862 A1 | 3/2012 | Jevans et al. |
| 2012/0151223 A1* | 6/2012 | Conde Marques ......................... G06F 21/6218 713/193 |
| 2012/0166582 A1* | 6/2012 | Binder .................. G06F 21/78 709/217 |
| 2012/0216246 A1 | 8/2012 | Brennan et al. |
| 2012/0297205 A1 | 11/2012 | Yuen et al. |
| 2013/0031376 A1 | 1/2013 | Rivera et al. |
| 2013/0091575 A1 | 4/2013 | Duncan et al. |
| 2013/0097660 A1 | 4/2013 | Das et al. |
| 2013/0179940 A1 | 7/2013 | Krummel |
| 2013/0227043 A1 | 8/2013 | Murakami |
| 2013/0238889 A1 | 9/2013 | Fernandez et al. |
| 2013/0291112 A1 | 10/2013 | Shue et al. |
| 2013/0305028 A1 | 11/2013 | Mo et al. |
| 2013/0311737 A1 | 11/2013 | Shaw et al. |
| 2014/0006347 A1* | 1/2014 | Qureshi ............ G06F 21/6209 707/783 |
| 2014/0020083 A1 | 1/2014 | Fetik |
| 2014/0032691 A1 | 1/2014 | Barton et al. |
| 2014/0032733 A1 | 1/2014 | Barton et al. |
| 2014/0032758 A1 | 1/2014 | Barton et al. |
| 2014/0032759 A1 | 1/2014 | Barton et al. |
| 2014/0033271 A1 | 1/2014 | Barton et al. |
| 2014/0053234 A1 | 2/2014 | Barton et al. |
| 2014/0201518 A1 | 7/2014 | Yao et al. |
| 2014/0250521 A1 | 9/2014 | Gallardo et al. |
| 2014/0256418 A1 | 9/2014 | Kleppen et al. |
| 2014/0281534 A1 | 9/2014 | McCormack et al. |
| 2014/0310800 A1 | 10/2014 | Kabra et al. |
| 2014/0310824 A1 | 10/2014 | Ma |
| 2014/0358995 A1 | 12/2014 | Bare et al. |
| 2014/0380310 A1 | 12/2014 | Wei et al. |
| 2015/0074759 A1 | 3/2015 | Shanklin |
| 2015/0163206 A1 | 6/2015 | McCarthy et al. |
| 2015/0180884 A1 | 6/2015 | Bhargava et al. |
| 2015/0180908 A1 | 6/2015 | Dang et al. |
| 2015/0339497 A1 | 11/2015 | Kurian |
| 2016/0014111 A1 | 1/2016 | Kurz |
| 2016/0055026 A1 | 2/2016 | Fitzgerald et al. |
| 2016/0065587 A1 | 3/2016 | Hesselink et al. |
| 2016/0066085 A1 | 3/2016 | Chang et al. |
| 2016/0078224 A1 | 3/2016 | Jeansonne et al. |
| 2016/0099963 A1 | 4/2016 | Mahaffey et al. |
| 2016/0132525 A1 | 5/2016 | Avery et al. |
| 2016/0292173 A1 | 10/2016 | Hanes |
| 2016/0306966 A1 | 10/2016 | Srivastava et al. |
| 2017/0103215 A1 | 4/2017 | Mahaffey et al. |
| 2017/0206034 A1 | 7/2017 | Fetik |
| 2017/0206351 A1 | 7/2017 | Jay et al. |
| 2017/0213023 A1 | 7/2017 | Shanklin et al. |
| 2017/0223024 A1 | 8/2017 | Desai et al. |
| 2017/0230365 A1 | 8/2017 | Poete |
| 2017/0235966 A1 | 8/2017 | Ray et al. |
| 2017/0235967 A1 | 8/2017 | Ray et al. |
| 2017/0300690 A1* | 10/2017 | Ladnai .................. G06F 21/56 |
| 2017/0302458 A1 | 10/2017 | Berger et al. |
| 2017/0302653 A1 | 10/2017 | Ortner et al. |
| 2017/0302685 A1 | 10/2017 | Ladnai et al. |
| 2017/0302696 A1 | 10/2017 | Schutz et al. |
| 2017/0323111 A1 | 11/2017 | Hernandez Gonzalez et al. |
| 2017/0351854 A1 | 12/2017 | Knapp et al. |
| 2018/0089457 A1 | 3/2018 | Kabra et al. |
| 2018/0198801 A1* | 7/2018 | Gopalakrishna ...... H04L 63/145 |
| 2018/0205761 A1 | 7/2018 | Jacobs |
| 2018/0227320 A1 | 8/2018 | Ladnai et al. |

(56) References Cited

U.S. PATENT DOCUMENTS

| | | | |
|---|---|---|---|
| 2019/0121978 A1* | 4/2019 | Kraemer | G06F 21/565 |
| 2020/0019699 A1* | 1/2020 | Araujo | G06N 3/08 |

FOREIGN PATENT DOCUMENTS

| | | |
|---|---|---|
| KR | 10-2012-0060396 A | 6/2012 |
| KR | 10-1349849 B1 | 1/2014 |
| WO | 2011148224 A1 | 12/2011 |

OTHER PUBLICATIONS

Singh, Jasvinder et al. Semantics-empowered middleware implementation for home ecosystem gateway. 2014 IEEE International Conference on Pervasive Computing and Communication Workshops. https://ieeexplore.ieee.org/stamp/stamp.jsp?tp=&arnumber=6815248 (Year: 2014).*

Zhang, Wu et al. Architecture Design of Embedded Home IMS Gateway based on Convergence of IMS and Home Network. 2008 International Conference on Embedded Software and Systems. https://ieeexplore.ieee.org/stamp/stamp.jsp?tp=&arnumber=4595569 (Year: 2008).*

PCT/US2019/054721, International Search Report, pp. 7, dated Jan. 23, 2020.

Extended European Search Report dated Oct. 15, 2019 for corresponding EP Application No. 17807220.3.

ISA/KR, International Search Report and Written Opinion of the International Searching Authority for Application No. PCT/US2017/033054, dated Aug. 10, 2017, 15 pages.

ISA/KR, International Search Report and Written Opinion of the International Searching Authority for Application No. PCT/US2017/033079, dated Aug. 11, 2017, 12 pages.

ISA/KR, International Search Report and Written Opinion of the International Searching Authority for Application No. PCT/US2017/033224, dated Aug. 14, 2017, 11 pages.

ISA/KR, International Search Report and Written Opinion of the International Searching Authority for Application No. PCT/US2017/033235, dated Aug. 7, 2017, 11 pages.

ISA/KR, International Search Report and Written Opinion of the International Searching Authority for Application No. PCT/US2017/033251, dated Aug. 10, 2017, 12 pages.

ISA/KR, International Search Report and Written Opinion of the International Searching Authority for Application No. PCT/US2017/033288, dated Aug. 7, 2017, 13 pages.

ISA/KR, International Search Report and Written Opinion of the International Searching Authority for Application No. PCT/US2017/033481, dated Aug. 25, 2017, 12 pages.

Blue Coat; "Blue Coat ICS Protection Scanner Station Version-USB Malware Defense for Industrial Computers-User Guide, version 5.3.1", www.bluecoat.com; 2014; 16 pages.

Extended European Search Report dated Jan. 8, 2020 for corresponding EP Application No. 17807230.2.

* cited by examiner

Uninstall or change a program

To uninstall a program, select it from the list and then click Uninstall, Change, or Repair.

| Name | Publisher | Installed On |
|---|---|---|
| Dell System Detect | Dell | 7/11-2017 |
| AtixBrokerClientInstaller | Honeywell | 8/9-2017 |
| Secure Media Exchange (Core) | Honeywell | 8/9-2017 |
| Secure Media Exchange (DAT) | Honeywell | 8/9-2017 |
| SMX_Destmach-Core | Honeywell | 8/9-2017 |
| AutomationInstaller | Honeywell | 8/9-2017 |
| SMX_DestMach-DotNet452 | Honeywell | 8/9-2017 |
| IBM Endpoint Manager Client | IBM Corp. | 7/12-2017 |
| Intel Management Engine Components | Intel Corporation | 7/12-2017 |
| Intel Dynamic Platform and Thermal Framework | Intel Corporation | 7/12-2017 |
| Intel Graphics Driver | Intel Corporation | 7/12-2017 |
| McAfee Solidifier | McAfee, Inc. | 8/9-2017 |
| Microsoft Visual C++ 2015 Redistributable (x86) - 14.023918 | Microsoft Corporation | 7/11-2017 |
| Microsoft Visual C++ 2015 Redistributable (x64) - 14.023918 | Microsoft Corporation | 7/11-2017 |
| Realtek PC Camera Driver | Realtek Semiconductor Corp. | 7/11-2017 |
| Realtek High Definition Audio Driver | Realtek Semiconductor Corp. | 7/12-2017 |
| Realtek Audio COM Components | Realtek Semiconductor Corp. | 7/11-2017 |

SYSTEM AND METHOD FOR DEPLOYING AND CONFIGURING CYBER-SECURITY PROTECTION SOLUTION USING PORTABLE STORAGE DEVICE

CROSS-REFERENCE TO RELATED APPLICATIONS

This application claims the benefit under 35 U.S.C. § 119(e) of U.S. Provisional Application No. 62/744,191, filed Oct. 11, 2018, which is incorporated herein by reference.

TECHNICAL FIELD

This disclosure relates generally to computing and network security. More specifically, this disclosure relates to a system and method for deploying and configuring a cyber-security protection solution using a portable storage device.

BACKGROUND

Numerous organizations have private computing networks supporting some type of access controls or other cyber-security controls to limit network access. This is highly necessary in protected environments such as, but not limited to industrial control systems, manufacturing plants or other facilities, hospitals or other healthcare facilities, and classified network areas. The need to transfer information into and out of secure networks has led to the increased use of removable media, such as portable Universal Serial Bus (USB) drives. Removable media are often used to move information or files (such as application patches, diagnostics applications, or documentation, etc.) into or out of secure networks. Unfortunately, removable media provide a new vector for cyber-attacks into protected systems. In many instances, removable media represent one of the primary inbound vectors through which viruses and other malware can enter secure networks.

SUMMARY

This disclosure provides a system and method for deploying and configuring a cyber-security protection solution using a portable storage device.

In a first example, an apparatus may comprise a portable storage device comprising an interface configured to be coupled to a computing device and a memory storing instructions to be executed by the computing device, the instructions comprising instructions that when executed cause the computing device to implement a cyber-security protection solution.

Alternatively or additionally to any of the examples above, in another example, the memory may further store operating system files to be executed by the computing device, wherein the cyber-security protection solution includes booting the computing device off of the portable storage device using the operating system files.

Alternatively or additionally to any of the examples above, in another example, the cyber-security protection solution may include the computing device scanning a second storage device and determining whether the second storage device is usable in a protected environment.

Alternatively or additionally to any of the examples above, in another example, the cyber-security protection solution may include performing a check-in process to check-in a second storage device so that one or more files on the second storage device are: (i) accessible by one or more protected nodes within a protected environment; and (ii) not accessible by nodes outside of the protected environment.

Alternatively or additionally to any of the examples above, in another example, the protected environment may include one or more protected nodes, and wherein each of the one or more protected nodes may include an agent for detecting whether the second storage device is checked-in or not.

Alternatively or additionally to any of the examples above, in another example, the agents may be configured to allow the corresponding protected node to access one or more files on the second storage device when the agent detects that the second storage device is checked-in.

Alternatively or additionally to any of the examples above, in another example, the agents may be configured to not allow the corresponding protected node to access one or more files on the second storage device when the agent detects that the second storage device is not checked-in.

Alternatively or additionally to any of the examples above, in another example, the apparatus may further comprise a security manager, wherein the agents of the one or more protected nodes are in operative communication with the security manager.

Alternatively or additionally to any of the examples above, in another example, the cyber-security protection solution may include performing a check-out process to check-out the second storage device so that one or more files on the second storage device are: (i) not accessible by the one or more protected nodes within the protected environment; and (ii) accessible by nodes outside of the protected environment.

In another example, a method may comprise coupling an interface of a portable storage device to a computing device and transferring instructions from a memory of the portable storage device to the computing device, the instructions comprising instructions that when executed cause the computing device to implement a cyber-security protection solution.

Alternatively or additionally to any of the examples above, in another example, the instructions may comprise operating system instructions, and the cyber-security protection solution may include booting the computing device off of the portable storage device using the operating system instructions.

Alternatively or additionally to any of the examples above, in another example, the cyber-security protection solution may include the computing device scanning a second storage device and determining whether the second storage device is usable in a protected environment.

Alternatively or additionally to any of the examples above, in another example, the cyber-security protection solution may include performing a check-in process to check-in a second storage device so that one or more files on the second storage device are: (i) accessible by one or more protected nodes within a protected environment; and (ii) not accessible by nodes outside of the protected environment.

Alternatively or additionally to any of the examples above, in another example, the protected environment may include one or more protected nodes, and wherein each of the one or more protected nodes includes an agent for detecting whether the second storage device is checked-in or not.

Alternatively or additionally to any of the examples above, in another example, the agents may be configured to allow the corresponding protected node to access one or more files on the second storage device when the agent detects that the second storage device is checked-in.

Alternatively or additionally to any of the examples above, in another example, the agents may be configured to not allow the corresponding protected node to access one or more files on the second storage device when the agent detects that the second storage device is not checked-in.

Alternatively or additionally to any of the examples above, in another example, the agents of the one or more protected nodes may be in operative communication with a security manager.

Alternatively or additionally to any of the examples above, in another example, the cyber-security protection solution may include performing a check-out process to check-out the second storage device so that one or more files on the second storage device are: (i) not accessible by the one or more protected nodes within the protected environment; and (ii) accessible by nodes outside of the protected environment.

In another example, a cyber-security protection solution system may comprise a computing device and a portable storage device. The portable storage device may comprise an interface configured to be coupled to an interface of the computing device and a memory storing one or more instructions including one or more operating system instructions to be executed by the computing device. When the interface of the portable storage device is coupled to the computing device, the computing device may be configured to implement a cyber-security protection solution including booting the computing device off of the portable storage device using the one or more operating system instructions stored in the memory of the portable storage device and scanning a second storage device and determining whether the second storage device is usable in a protected environment.

Alternatively or additionally to any of the examples above, in another example, the cyber-security protection solution may include performing a check-in process to check-in the second storage device so that one or more files on the second storage device are: (i) accessible by one or more protected nodes within a protected environment; and (ii) not accessible by nodes outside of the protected environment.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional or other embodiment unless clearly stated to the contrary.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the disclosure may be implemented in any type of suitably arranged device or system.

As noted above, removable media such as portable Universal Serial Bus (USB) drives represent one of the primary inbound vectors through which viruses and other malware can enter secure networks. Other removable media may include, for example, Secure Digital (SD) cards, SDHC, other Flash memory, CDs, DVDs, portable hard drives and/or any other removable media. In an "air-gapped" environment, for example, a computing device or network is physically isolated from unsecured networks such as the Internet or other external networks. The isolation may be absolute or nearly absolute. Such an approach does provide a way to mitigate cyber-security risks, but there needs to be some mechanism to transfer data and/or other information into and out of the air-gapped device or system. In many cases, USB drives or other mass storage devices are used to transfer data and/or other information to and from an air-gapped device or system. However, malware can enter (and has entered) air-gapped devices or systems through USB drives or other mass storage devices. Thus, cyber-security protection against malware on mass storage devices has become of paramount importance for protecting secure computing networks and systems from cyber-security threats.

In one example approach to combatting these types of cyber-security threats, the SECURE MEDIA EXCHANGE ("SMX") technology from HONEYWELL INTERNATIONAL INC. can be used to scan a USB drive and/or other mass storage device for malware and/or other cyber-security threats. Assuming there is no cyber-security threat detected, the SMX technology can "check in" the mass storage device. The "check-in" can involve scanning the mass storage device for malware, quarantining and/or deleting files containing malware or other "bad" files, allowing only "clean" files to remain accessible on the mass storage device, and/or modifying the file system of the mass storage device so that only devices within a designated secure environment can use the mass storage device. Once use of the mass storage device is completed in the secure environment, the SMX technology can "check out" the mass storage device. The "check-out" can involve removing any desired data from the mass storage device and restoring the file system of the mass storage device so that devices outside a secure environment can use the mass storage device but not devices inside the secure environment.

It is contemplated that devices outside the secure environment may have no meaningful access to the mass storage device when the mass storage device is "checked in," and devices inside the secure environment may have no meaningful access to the mass storage device when the mass storage device is "checked out." A lack of meaningful access may mean, for example, that a device can initially enumerate a mass storage device but cannot read data from or write data to the mass storage device (without first completely reformatting the mass storage device).

In this or other cyber-security protection solutions, a "gateway" device can be responsible for examining the contents of a mass storage device to detect malware or other cyber-security threats. In some cases, gateways for a cyber-security protection solution (such as one using SMX technology) can be implemented using tablet computers or other computing devices having one or more USB slots, Secure Digital High Capacity (SDHC) or other Flash memory slots, or other interfaces for coupling to mass storage devices. However, tablet computers or other computing devices can be relatively expensive and can become obsolete quickly. Also, business development managers, sales and marketing personnel, or other personnel often need to use their own tablet computers or other computing devices to demonstrate the functionality of a cyber-security protection solution to potential customers. Again, these computing devices can be relatively expensive and can become obsolete quickly. Replacing tablet computers or other computing devices in both situations can be expensive (especially if a large number of computing devices need to be replaced) and typically needs to be performed every few years (if not sooner).

This disclosure provides techniques for deploying and configuring a cyber-security protection solution using a portable storage device. As described in more detail below, the portable storage device can cause any computing device that is able to read the portable storage device, boot off the portable storage device, and execute one or more specific programs so that the computing device itself becomes a gateway for a cyber-security protection solution. As a result, numerous devices can be used as gateways for scanning USB drives or other mass storage devices. This can enable easier and more agile protection schemes for protected systems.

Figure 1:
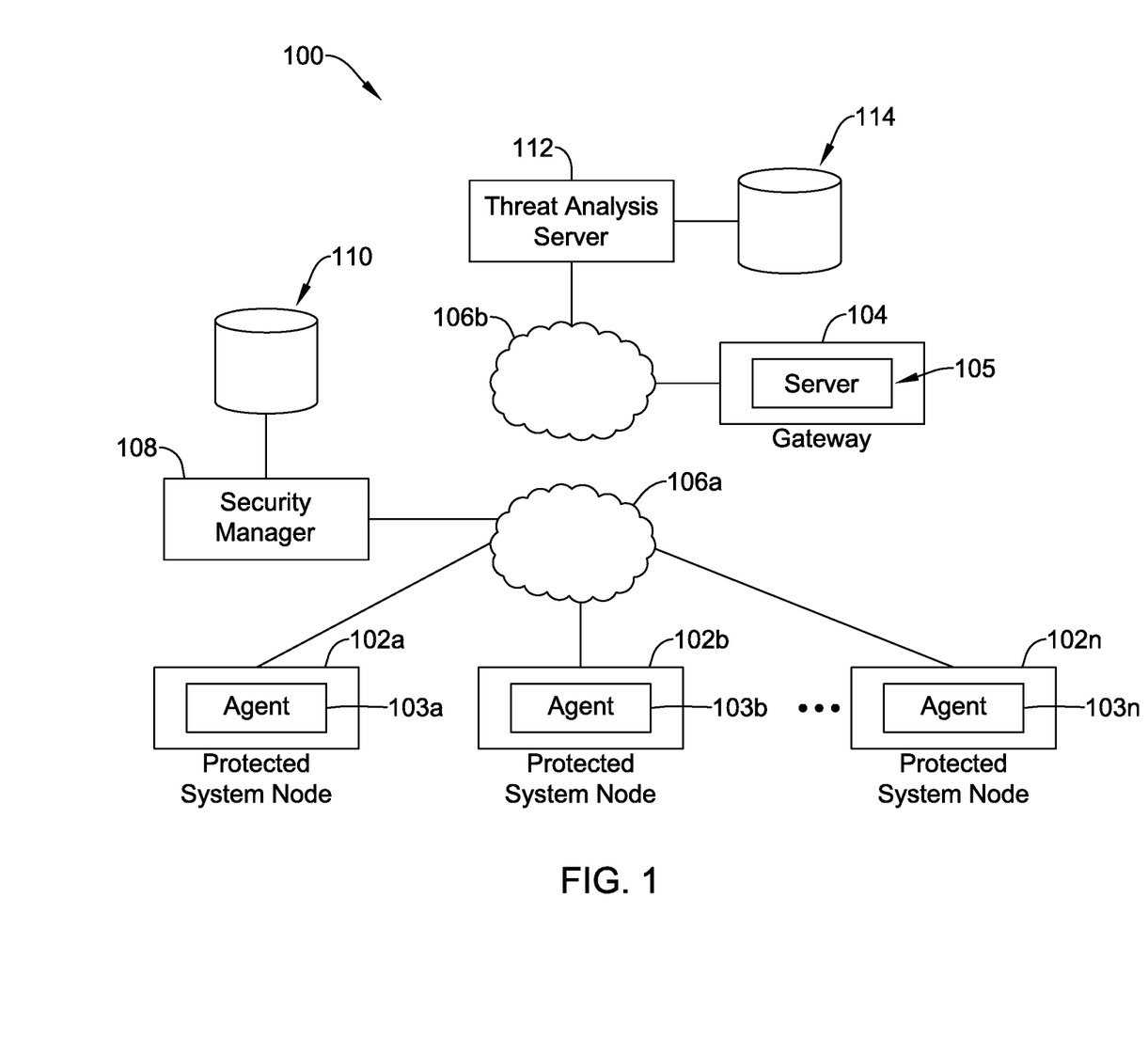
FIG. 1 illustrates an example cyber-security protection system according to this disclosure.

FIG. 1 illustrates an example cyber-security protection system 100 according to this disclosure. As shown in FIG. 1, the system 100 includes one or more protected system nodes 102a-102n. Each protected system node 102a-102n denotes a computing or networking device that forms a part of a protected system. Each protected system node 102a-102n could perform any desired function or functions within a protected system. For example, a protected system node 102a-102n could be used to perform functions related to industrial process control, such as functions for controlling manufacturing plants or other manufacturing facilities. A protected system node 102a-102n could also be used to store confidential data, such as in hospitals or other healthcare facilities or in classified network areas. Each protected system node 102a-102n may include any suitable computing or networking device that supports any desired function(s), such as a personal computer, laptop computer, or server computer running any suitable operating system.

Each protected system node 102a-102n in this example includes a cyber-security protection agent 103a-103n, respectively. Each cyber-security protection agent 103a-103n controls or manages the use of removable media with an associated protected system node 102a-102n. For example, each cyber-security protection agent 103a-103n can determine whether a storage device has been "checked-in" by examining contents of the storage device, or the storage device itself for a manifest, certificate, or other identifier. If the storage device has been checked-in, the cyber-security protection agent 103a-103n allows the associated protected system node 102a-102n to access and use the storage device. If the storage device has not been checked-in, the cyber-security protection agent 103a-103n blocks the use of the storage device by the associated protected system node 102a-102n. Each cyber-security protection agent 103a-103n can be implemented in any suitable manner, such as by using one or more software or firmware routines executed by the associated protected system node 102a-102n.

The illustrative system 100 also includes one or more cyber-security protection gateways 104. Each cyber-security protection gateway 104 is used to support the "check-in" and "check-out" processes for storage devices. For example, when a user plugs a USB drive or other storage device into a suitable interface of a cyber-security protection gateway 104, a check-in procedure can be initiated, either by a user or automatically. Example functions of the check-in procedure can include, for example, the cyber-security protection gateway 104 scanning any files on the storage device and determining whether viruses and/or other malware is present on the storage device. Example functions of the check-in procedure can also include the cyber-security protection gateway 104 quarantining any detected malware, storing various data (such as, but not limited to, digital signatures or audit logs) on the storage device, possibly encrypting clean files on the storage device, and/or locking a file system of the storage device. At this point, the storage device is considered checked-in and therefore "trusted," so the storage device can be used with one, some, or all of the protected system nodes 102a-102n but not with any untrusted nodes.

When a user plugs a checked-in USB drive or other storage device into a suitable interface of a cyber-security protection gateway 104, a check-out procedure may be initiated, either by a user or automatically. Example functions of the check-out procedure can include the cyber-security protection gateway 104 scanning any new files on the storage device and determining whether viruses and/or other malware is present on the storage device. Example functions of the check-out procedure could also include the cyber-security protection gateway 104 quarantining any detected malware, removing various data (such as, but not limited to, digital signatures or audit logs) from the storage device, decrypting various encrypted elements on the storage device, and/or unlocking the file system of the storage device. At that point, the storage device is considered checked-out and therefore "untrusted," so the storage device could be used with untrusted nodes but not with the protected system nodes 102a-102n.

Each cyber-security protection gateway 104 can include any suitable device or system for checking in and checking out removable media. Each cyber-security protection gateway 104 could, for example, denote a desktop computer, laptop computer, server computer, or tablet computer having at least one interface for coupling to removable media. Each cyber-security protection gateway 104 in this example may include a cyber-security protection server 105 within the cyber-security protection gateway 104. Each cyber-security protection server 105 can perform the check-in and check-out procedures. Each cyber-security protection server 105 could be implemented in any suitable manner, such as by using one or more software or firmware routines executed by the associated cyber-security protection gateway 104.

Collectively, the cyber-security protection agents 103a-103n and the cyber-security protection server(s) 105 provide an innovative approach for helping to ensure that information stored on removable media is authorized, safe, and unaltered. For example, the cyber-security protection agents 103a-103n may prevent the normal operation of USB interfaces or other peripheral device interfaces of the protected system nodes 102a-102n that might be used to connect to a storage device unless the storage device is first authorized (e.g. checked-in) by one of the cyber-security protection servers 105. Once authorized (e.g. checked-in), the storage device is made accessible to the protected system nodes 102a-102n through the cyber-security protection agents 103a-103n. Additionally, the cyber-security protection server(s) 105 may authorize individual files in order to allow safe files or file types to be brought into a protected system 102a-102n while blocking malicious or unwanted files or file types. This can again be enforced by the cyber-security protection agents 103a-103n, which block unauthorized files or file types at the protected system nodes 102a-102n.

The illustrative system 100 uses the "check-in" and "check-out" mechanisms to authorize removable media, specific files, and/or file types on the removable media. An end user wishing to use a storage device in a protected system 102a-102n first allows a cyber-security protection server 105 to scan and authorize the storage device, at which point the storage device is locked to prevent other uses of the storage device. Once locked, the storage device is only useable on protected system nodes 102a-102n having appropriately configured and authorized cyber-security protection agents 103a-103n. When the user is finished with his or her task, the storage device can be checked-out using a cyber-security protection server 105, restoring the storage device to its normal functionality and preventing use of the storage device with the protected system nodes 102a-102n.

In some cases, the check-in and check-out mechanisms of the cyber-security protection servers 105 and the operations of the cyber-security protection agents 103a-103n are able to maintain an audit trail of file transfers to and from a storage device. The check-in and check-out mechanisms of the cyber-security protection servers 105 and the operations of the cyber-security protection agents 103a-103n may also be able to pass configuration parameters, event logs, and/or other data between protected system nodes 102a-102n and an unprotected network without violating the tenants of a "zone and conduit" model of cyber-security where there is no direct network connection between the protected and unprotected networks. For example, one example of configuration parameters that may be passed to the cyber-security protection agents 103a-103n on the protected system nodes 102a-102n include whitelists and/or blacklists of files, file types, and/or media types that the cyber-security protection agents 103a-103n will or will not grant access to, bypassing normal protective behaviors.

Note that the cyber-security protection servers 105 can use a variety of malware detection methods or work in conjunction with a variety of malware detection software packages. Also note that the cyber-security protection servers 105 could receive administrator input to control how the cyber-security protection servers 105 decide which files, file types, and/or media types are authorized for use within a protected system 102a-102n. In general, any suitable techniques may be used for identifying files, file types, and/or media types to which the cyber-security protection agents 103a-103n allow access.

In one example, multiple networks 106a-106b may be present in the system 100. A first network 106a may support communications between the protected system nodes 102a-102n, while a second network 106b may support communications to and/or from the cyber-security protection gateways 104. The use of different networks 106a, 106b may allow the cyber-security protection gateways 104 to reside outside of the protected system (formed by at least the protected system nodes 102a-102n and the network 106a). However, the protected system nodes 102a-102n and the cyber-security protection gateways 104 could alternatively communicate over the same network(s). It is contemplated that each network 106a, 106b may include any suitable network or combination of networks.

The system 100 also optionally includes at least one security manager 108 and at least one database 110 used by or otherwise associated with the security manager(s) 108. Each security manager 108 denotes a system supporting the analysis of cyber-security data from information sources such as the cyber-security protection agents 103a-103n and/or the cyber-security protection servers 105. For example, a security manager 108 may analyze threat intelligence data and audit logs generated and supported by the cyber-security protection agents 103a-103n or other sources connected to the first network 106a. Note that each security manager 108 could be connected to the first network 106a and/or the second network 106b. In some cases, the security manager 108 may be connected to one of the first network 106a or second network 106b but not both, since the first network 106a may need to remain isolated from the second network 106b. The data from the cyber-security protection agents 103a-103n may be obtained directly from the cyber-security protection agents 103a-103n or indirectly, such as via storage devices that physically transport data from the cyber-security protection servers 105 or other components coupled to the second network 106b into the first network 106a. The ability to transport data to the security manager 108 indirectly may allow a wide range of data to be securely provided into a protected network.

In some cases, the security manager 108 analyzes the collected data (possibly including data from an unprotected network that might otherwise be unobtainable) to generate indicators identifying various cyber-security threats in the system 100. The collected threat intelligence data, audit logs, and/or other information may be stored in the database 110. Each security manager 108 may include any suitable structure used for analyzing cyber security-related data, such as threat data, vulnerability data, network statistics, diagnostics, maintenance information, and/or performance data. As a particular example, each security manager 108 may be an instantiation of a HONEYWELL RISK MANAGER™. Each database 110 may include any suitable structure for storing and retrieving data.

The system 100 may further optionally includes at least one threat analysis server 112 and at least one database 114 used by or otherwise associated with the threat analysis server(s) 112. Each threat analysis server 112 may denote a system supporting the analysis of data to identify threats associated with the system 100. For example, a threat analysis server 112 may denote a cloud-based or other computing platform that supports sandboxing, code analysis, reputation analysis, and/or behavioral analysis in order to identify new forms of malware. When a cyber-security protection server 105 is unable to determine whether code on a storage device includes malware, the cyber-security protection server 105 may provide the code to the threat analysis server 112 for evaluation. If a user or the threat analysis server 112 determines that the code is malicious, the threat analysis server 112 may update the cyber-security protection servers 105 with new threat information. The threat analysis server 112 may also obtain information identifying new cyber-security threats (such as, but not limited to, new malware signatures) from other sources and provide the threat information to the cyber-security protection servers 105. The threat analysis server 112 may further obtain information defining cyber-security threats identified by some of the cyber-security protection servers 105 and provide that information to others of the cyber-security protection servers 105. As a result, the overall system can "learn" about new threats over time and adapt accordingly. It is contemplated that the cyber-security protection servers 105 may be updated over time to accumulate intelligence regarding both known and unknown (zero-day) attacks.

The database 114 may be used to store various information about cyber-security threats or other aspects of the system 100. For example, the database 114 may be used to store information about known cyber-security attacks, industries and systems currently targeted by cyber-security attacks, and/or indicators that a device or system has been compromised. The database 114 may also be used to store information about threat patterns and advanced threat campaigns. The database 114 may further be used to store audit logs or other information collected from the cyber-security protection gateways 104. Each database 114 may include any suitable structure for storing and retrieving data.

Note that while the threat analysis server 112 and database 114 are shown here as forming part of the system, these components could reside outside of and be used in conjunction with the system 100. This may allow operations of the threat analysis server 112 to be provided as a service to a number of users in the same organization or in multiple organizations. As a particular example, the threat analysis server 112 may be used to generate detailed threat reports as a service to the operator of the system 100 and to operators of other protected systems.

As described in more detail below, at least one cyber-security protection gateway 104 can represent a computing device that executes instructions stored on a portable storage device (such as a USB drive or other storage device). The instructions could, for example, represent instructions implementing the cyber-security protection server 105 of the gateway 104. The instructions implementing the cyber-security protection server 105 can be encrypted (such as by using BITLOCKER or other encryption tool) in order to protect the instructions and prevent modification to the instructions. In some cases, the instructions stored on the portable storage device may be executed within various operating systems (such as WINDOWS, MAC, and LINUX operating systems) or in a single operating system, and the operating system files may be stored on the portable storage device to allow a computing device to be booted off of the portable storage device. As a particular example, the instructions stored on the portable storage device may cause a computing device to boot or reboot into a cyber-security program implementing the cyber-security protection server 105 so that no undesired applications are executing on the computing device and only the desired functionality of the computing device is available. Once booted or rebooted off of the portable storage device into this environment, the computing device can be used check in and check out storage devices as described above.

This approach can be used in a number of ways to support the use of a cyber-security protection solution. For example, a manager or other authorized personnel in an organization can have access to a portable storage device containing the cyber-security protection solution. When needed, the authorized personnel can retrieve the portable storage device and connect the portable storage device to a desired computing device in order to convert that computing device into a cyber-security protection gateway 104. The authorized personnel or other personnel can then use the gateway 104 to check in or check out storage devices as needed. As another example, business development managers, sales and marketing personnel, or other personnel can have access to a portable storage device and can take the portable storage device to potential customer sites or other locations. The personnel can then connect the portable storage device to a desired computing device in order to convert that computing device into a cyber-security protection gateway 104 so that the capabilities of the gateway 104 can be demonstrated. In this way, numerous computing devices can be easily converted into cyber-security protection gateways 104, which simplifies installation and reduces the need for dedicated expensive devices.

Although FIG. 1 illustrates one example of a cyber-security protection system 100, various changes may be made to FIG. 1. For example, the system 100 may include any number of protected system nodes 102a-102n, agents103a-103n, gateways 104, servers 105, networks 106a, 106b, security managers 108, threat analysis servers 112, databases110, 114, and other components. Also, FIG. 1 illustrates one example operational environment where a cyber-security protection solution can be deployed and configured using a portable storage device. This functionality can be used in any other suitable system.

Figure 2:
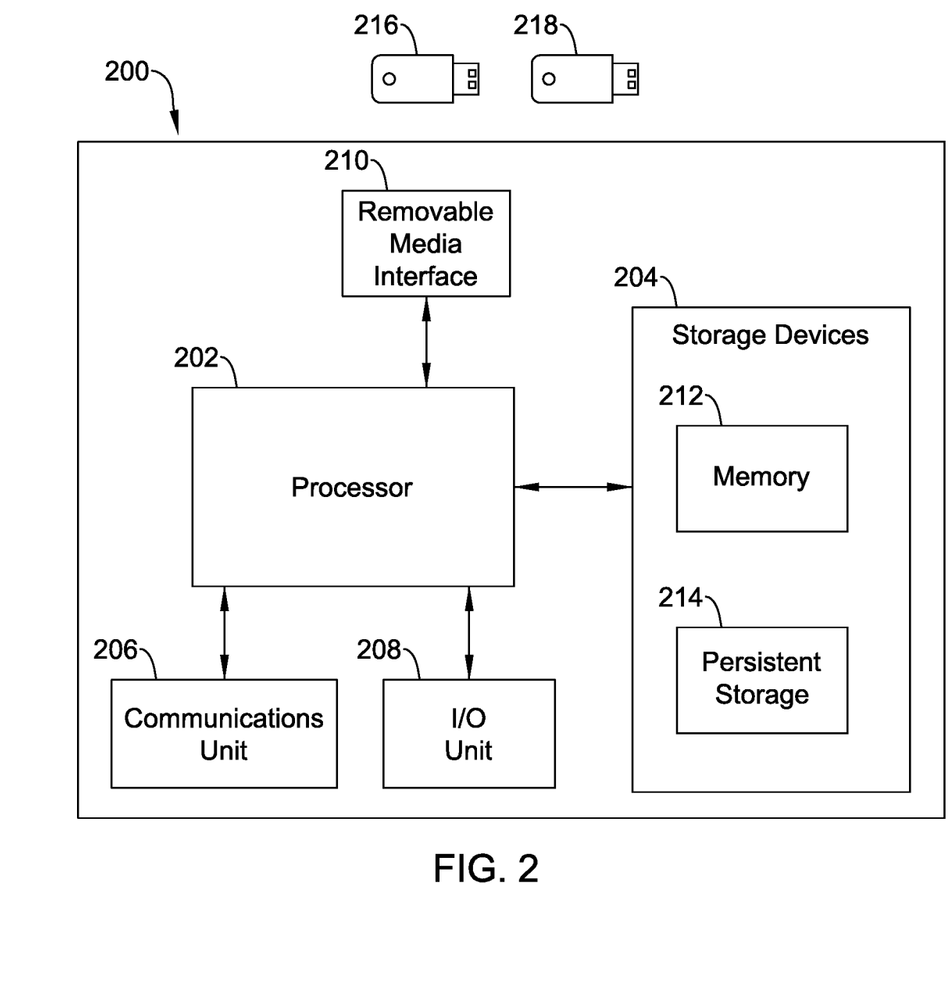
FIG. 2 illustrates an example device supporting deployment and configuration of a cyber-security protection solution using a portable storage device according to this disclosure.

FIG. 2 illustrates an example device 200 supporting deployment and configuration of a cyber-security protection solution using a portable storage device according to this disclosure. For example, the illustrative device 200 shown in FIG. 2 may denote a cyber-security protection gateway 104 in the system 100 of FIG. 1. However, the illustrative device 200 could be used in any other suitable system, and the cyber-security protection gateway 104 could be implemented in any other suitable manner.

As shown in FIG. 2, the illustrative device 200 includes at least one processor 202, at least one storage device 204, at least one communications unit 206, at least one input/output (I/O) unit 208, and at least one removable media interface 210. Each processor 202 can execute instructions, such as those that may be loaded into a memory 212 and/or stored on a portable storage device 216/218. Each processor 202 denotes any suitable processing device, such as one or more microprocessors, microcontrollers, digital signal processors, application specific integrated circuits (ASICs), field programmable gate arrays (FPGAs), or discrete circuitry. In some cases, the processor 202 may be a single microprocessor.

The memory 212 and a persistent storage 214 are examples of storage devices 204, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 206 supports communications with other systems or devices. For example, the communications unit 206 may include a network interface card or a wireless transceiver facilitating communications over a wired or wireless network. The communications unit 206 may support communications through any suitable physical or wireless communication link(s), such as wired Ethernet, WiFi, or cellular communication links.

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Each removable media interface 210 denotes a structure to which a portable storage device 216 or 218 can be coupled. For example, the device 200 may include one or more USB slots, SDHC or other Flash memory slots, or other interfaces for coupling to portable storage devices. Depending on the implementation, the device 200 may include a single removable media interface 210 or multiple removable media interfaces 210 of the same type or of different types. In this example, the portable storage device 216 represents a portable storage device containing instructions that implement a cyber-security protection server 105, and the portable storage device 218 represents a storage device to be checked in or checked out by the device 200. Each portable storage device 216 and 218 generally includes an interface configured to be coupled to an external device (like a computer) and a memory configured to store data and instructions.

When the device 200 is used to implement a cyber-security protection gateway 104, the processor(s) 202 can execute instructions implementing the server 105 retrieved from the portable storage device 216 via the removable media interface 210. When a USB drive or other mass storage device 218 is subsequently coupled to a removable media interface 210, the processor(s) 202 may execute instructions for checking-in or checking-out the portable storage device 218. The processor(s) 202 may also execute instructions for interacting with a security manager 108, threat analysis server 112, and/or other external system.

As noted above, the portable storage device 216 may include instructions for implementing the cyber-security protection server 105 on the device 200. In some embodiments, the portable storage device 216 may include a WINDOWS Imaging Format (WIF) file that includes the cyber-security protection server 105 plus any operating system (OS) files and any other necessary files. In particular embodiments, the WIF file can be created using the MICROSOFT "Create a Windows To Go Workspace" wizard. The WIF file can then be deployed to any suitable device 200 via the portable storage device 216. After booting into the operating system off of the portable storage device 216, the device 200 may then functions as a cyber-security protection gateway 104.

It should be noted here that by deploying a cyber-security protection server 105 in this manner, the cyber-security protection server 105 can have access to the underlying communication capabilities of the device 200 on which the server 105 is deployed. Thus, for example, if the device 200 supports communications via Ethernet, WiFi, or cellular connections, the cyber-security protection server 105 can use the same connections for communications as needed. This may allow, for example, devices connected in numerous ways (such as to different areas of an industrial process control and automation system) to obtain software updates, malware definition file updates, or other updates to keep the cyber-security protection server 105 up-to-date.

The portable storage device 216 may include any suitable storage device that can store instructions for causing a computing device to function as a cyber-security protection gateway 104. For example, the portable storage device 216 may include a portable USB drive, such as a "thumb drive." In some instances, the portable storage device 216 can represent a certified "Windows To Go" USB device. Examples of such a device are the DATATRAVELER WORKSPACE USB devices from KINGSTON TECHNOLOGY CORP. In some cases, the USB drives allows the device 200 to boot into the cyber-security protection server 105 within one or several seconds, although this depends on the capabilities of the device 200 itself and the portable storage device 216.

Although FIG. 2 illustrates one example of a device 200 supporting deployment and configuration of a cyber-security protection solution, various changes may be made to FIG. 2. For example, various components in FIG. 2 could be combined, further subdivided, or omitted and additional components could be added according to particular needs. Also, computing devices can come in a wide variety of configurations, and FIG. 2 is not intended to limit this disclosure to any particular configuration of computing device.

Figure 3:
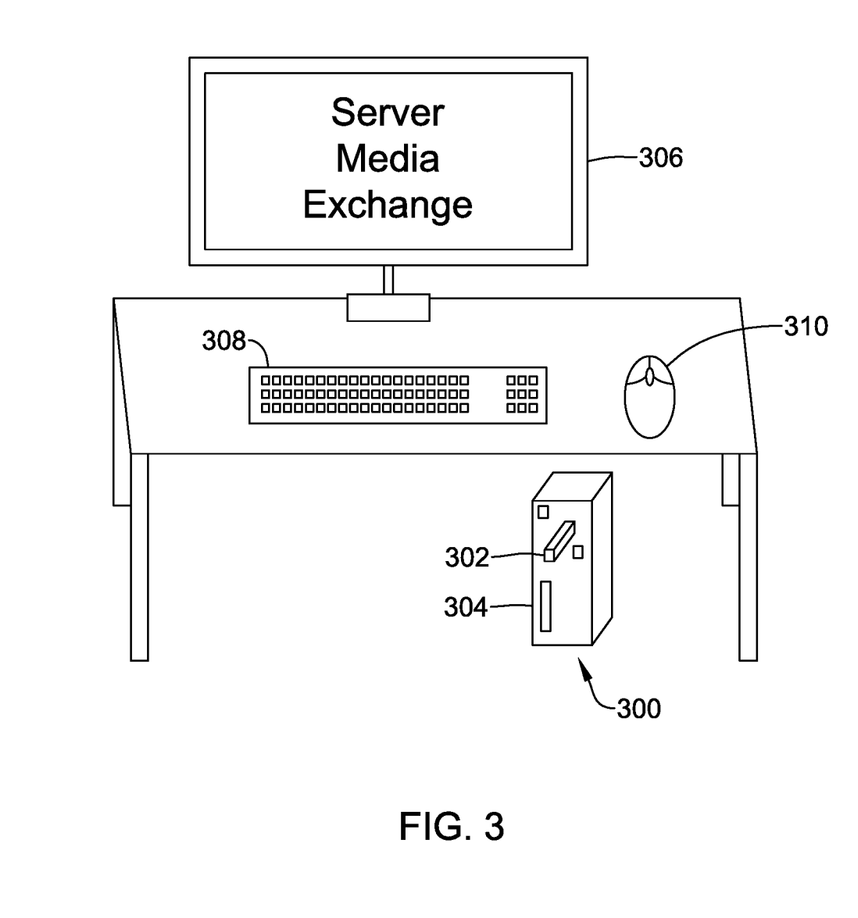
FIGS. 3 and 4 illustrate an example deployment and configuration of a cyber-security protection solution using a portable storage device according to this disclosure.
Figure 4:
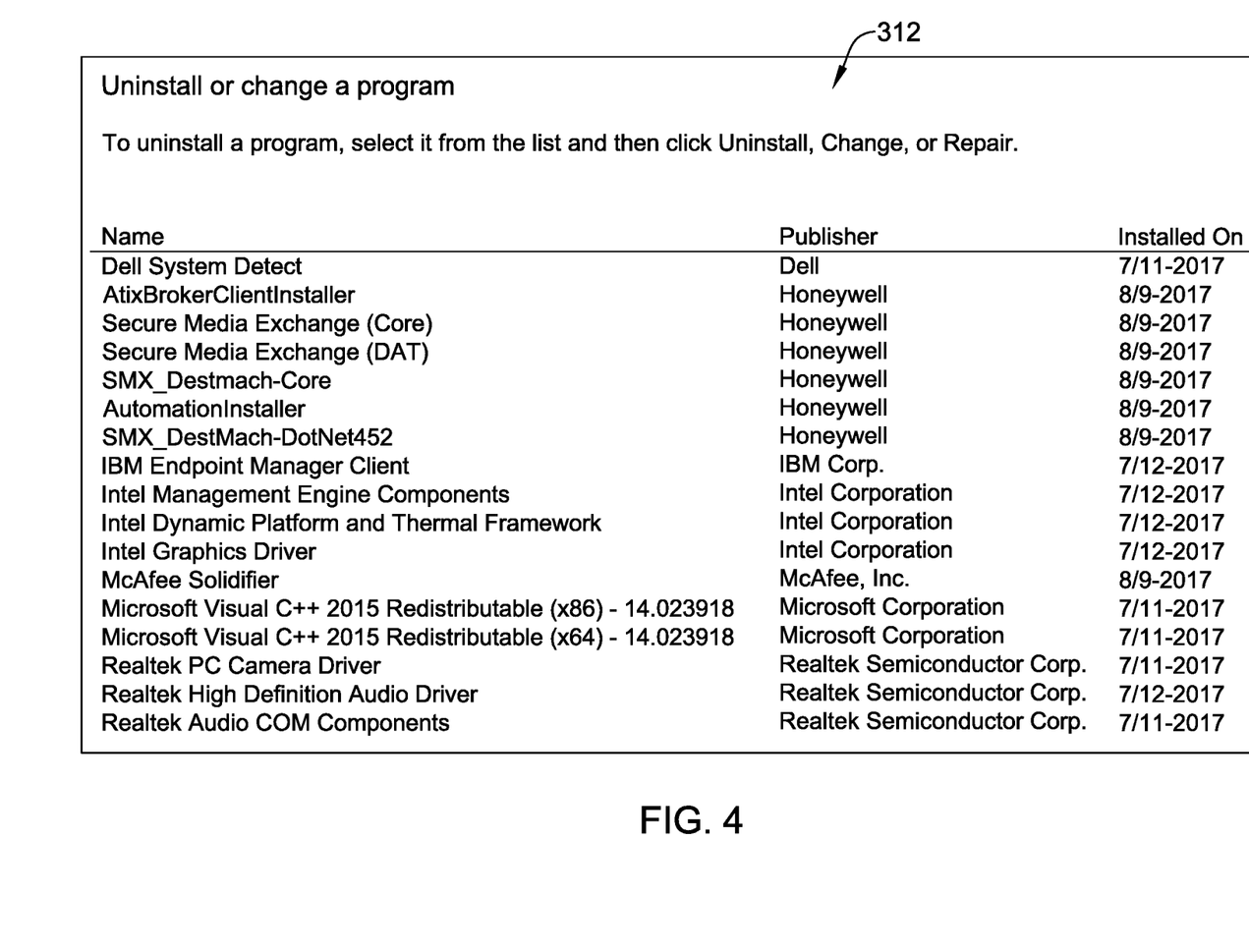

FIGS. 3 and 4 illustrate an example deployment and configuration of a cyber-security protection solution using a portable storage device according to this disclosure. In particular, FIG. 3 illustrates an example computing device 300 that boots into a cyber-security protection server 105 via a portable storage device 302. In the example shown, the computing device 300 may take the form of a desktop computer including a tower 304 that houses a processor, a memory, etc., a display 306, a keyboard 308, and a mouse 310. However, as described above, the computing device 300 is not limited to the configuration illustrated in FIG. 3. FIG. 4 illustrates some example contents 312 of the portable storage device 302 used to deploy and configure the cyber-security protection solution on the device 300. In this example, the portable storage device 302 may include the instructions for implementing the cyber-security protection server 105 (using SMX in this example), as well as operating system components (using WINDOWS in this example).

Although FIGS. 3 and 4 illustrate one example of deployment and configuration of a cyber-security protection solution, various changes may be made to FIGS. 3 and 4. For example, other computing devices and other portable storage devices could be used. Also, this disclosure is not limited to use with SMX technology or WINDOWS technology.

Note that additional details regarding example features and functions of the SMX technology can be found in the following U.S. patent application publications (all of which are hereby incorporated by reference).

U.S. Patent Application Publication No. 2017/0351854
U.S. Patent Application Publication No. 2017/0351858
U.S. Patent Application Publication No. 2017/0351870
U.S. Patent Application Publication No. 2017/0351877
U.S. Patent Application Publication No. 2017/0353460
U.S. Patent Application Publication No. 2017/0353461
U.S. Patent Application Publication No. 2017/0353484

Note, however, that the cyber-security protection solution used here can be implemented in any other suitable manner.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
  a portable storage device comprising:
    an interface configured to be removably coupled to a computing device; and
    a memory storing instructions to be executed by the computing device, the instructions comprising:
      operating system instructions for booting the computing device;
      instructions that when executed cause the computing device to implement a cyber-security protection solution, wherein the cyber-security protection solution includes:
        booting the computing device off of the portable storage device using the operating system instructions stored in the memory of the portable storage device; and
        once the computing device is booted off the operating system instructions, configuring the computing device to operate as a cyber-security protection gateway that is configured to perform a check-in process to check-in each of one or more removable storage devices that are subsequently coupled to the computing device so that one or more files on each of the one or more removable storage device are: (i) accessible by one or more protected nodes within a protected environment and (ii) not accessible by nodes outside of the protected environment.

2. The apparatus of claim 1 wherein the protected environment includes one or more protected nodes, and wherein each of the one or more protected nodes includes an agent for detecting whether a corresponding one of the removable storage devices is checked-in or not.

3. The apparatus of claim 2, wherein the agents are configured to allow the corresponding protected node to access one or more files on the corresponding one of the removable storage devices when the agent detects that the corresponding one of the removable storage devices is checked-in.

4. The apparatus of claim 3, wherein the agents are configured to not allow the corresponding protected node to access one or more files on the corresponding one of the removable storage devices when the agent detects that the corresponding one of the removable storage devices is not checked-in.

5. The apparatus of claim 2, further comprising a security manager, wherein the agents of the one or more protected nodes are in operative communication with the security manager.

6. The apparatus of claim 1, wherein the cyber-security protection solution includes performing a check-out process to check-out one or more of the removable storage devices so that one or more files on the corresponding one of the removable storage devices are: (i) not accessible by the one or more protected nodes within the protected environment; and (ii) accessible by nodes outside of the protected environment.

7. A method comprising:
  coupling an interface of a portable storage device to a computing device; and
  transferring instructions from a memory of the portable storage device to the computing device, the instructions comprising instructions that when executed cause the computing device to implement a cyber-security protection solution, wherein the cyber-security protection solution includes:
    booting the computing device off of the portable storage device, and
    once the computing device is booted off the portable storage device, configuring the computing device to operate as a cyber-security protection gateway that performs a check-in process to check-in each of one or more removable storage devices that are subsequently coupled to the computing device so that one or more files on each of the one or more removable storage device are: (i) accessible by one or more protected nodes within a protected environment; and (ii) not accessible by nodes outside of the protected environment.

8. The method of claim 7, wherein the instructions comprise operating system instructions for booting the computing device off of the portable storage device.

9. The method of claim 7, wherein the cyber-security protection solution includes the computing device scanning each of one or more removable storage devices and determining whether each of one or more removable storage devices is usable in a protected environment.

10. The method of claim 7, wherein the protected environment includes one or more protected nodes, and wherein each of the one or more protected nodes includes an agent for detecting whether a corresponding one of the removable storage devices is checked-in or not.

11. The method of claim 10, wherein the agents are configured to allow the corresponding protected node to access one or more files on the corresponding one of the removable storage devices when the agent detects that the second storage device is checked-in.

12. The method of claim 11, wherein the agents are configured to not allow the corresponding protected node to access one or more files on the corresponding one of the removable storage devices when the agent detects that the corresponding one of the removable storage devices is not checked-in.

13. The method of claim 10, further comprising a security manager, wherein the agents of the one or more protected nodes are in operative communication with the security manager.

14. The method of claim 7, wherein the cyber-security protection solution includes performing a check-out process to check-out one or more of the removable storage devices so that one or more files on the corresponding one of the removable storage devices are: (i) not accessible by the one or more protected nodes within the protected environment; and (ii) accessible by nodes outside of the protected environment.

15. A cyber-security protection solution system comprising:
a computing device;
a portable storage device comprising:
an interface configured to be coupled to an interface of the computing device; and
a memory storing one or more instructions including one or more operating system instructions to be executed by the computing device, wherein when the interface of the portable storage device is coupled to the computing device, the computing device is configured to implement a cyber-security protection solution including:
booting the computing device off of the portable storage device using the one or more operating system instructions stored in the memory of the portable storage device; and
once the computing device is booted off the portable storage device, configuring the computing device to operate as a cyber-security protection gateway that is configured to scan a removable storage device that is subsequently coupled to the computing device and determining whether the removable storage device is usable in a protected environment.

16. The cyber-security protection solution system of claim 15, wherein the cyber-security protection solution includes performing a check-in process to check-in the removable storage device so that one or more files on the removable storage device are: (i) accessible by one or more protected nodes within a protected environment; and (ii) not accessible by nodes outside of the protected environment.

* * * * *